March 26, 1968 W. A. GEYDER 3,375,332

FLUX-RESPONSIVE REPRODUCING HEAD FOR MAGNETIC TAPE RECORDERS

Filed May 28, 1964 2 Sheets-Sheet 1

William A. Geyder
INVENTOR

BY [signature]

ATTORNEY

March 26, 1968 W. A. GEYDER 3,375,332

FLUX-RESPONSIVE REPRODUCING HEAD FOR MAGNETIC TAPE RECORDERS

Filed May 28, 1964 2 Sheets-Sheet 2

William A. Geyder
INVENTOR

BY

ATTORNEY 3,375,332

FLUX-RESPONSIVE REPRODUCING HEAD FOR MAGNETIC TAPE RECORDERS

William A. Geyder, 8510 Flower Ave., Apt. 2-B, Takoma Park, Md. 20045

Filed May 28, 1964, Ser. No. 371,147
8 Claims. (Cl. 179—100.2)

ABSTRACT OF THE DISCLOSURE

A magnetic tape playback head which performs as a flux-responsive reproducer device, having a saturable core reproducer head with flux detecting windings encircled by an air core coil which is energized by an A.C. voltage.

Figure 1:
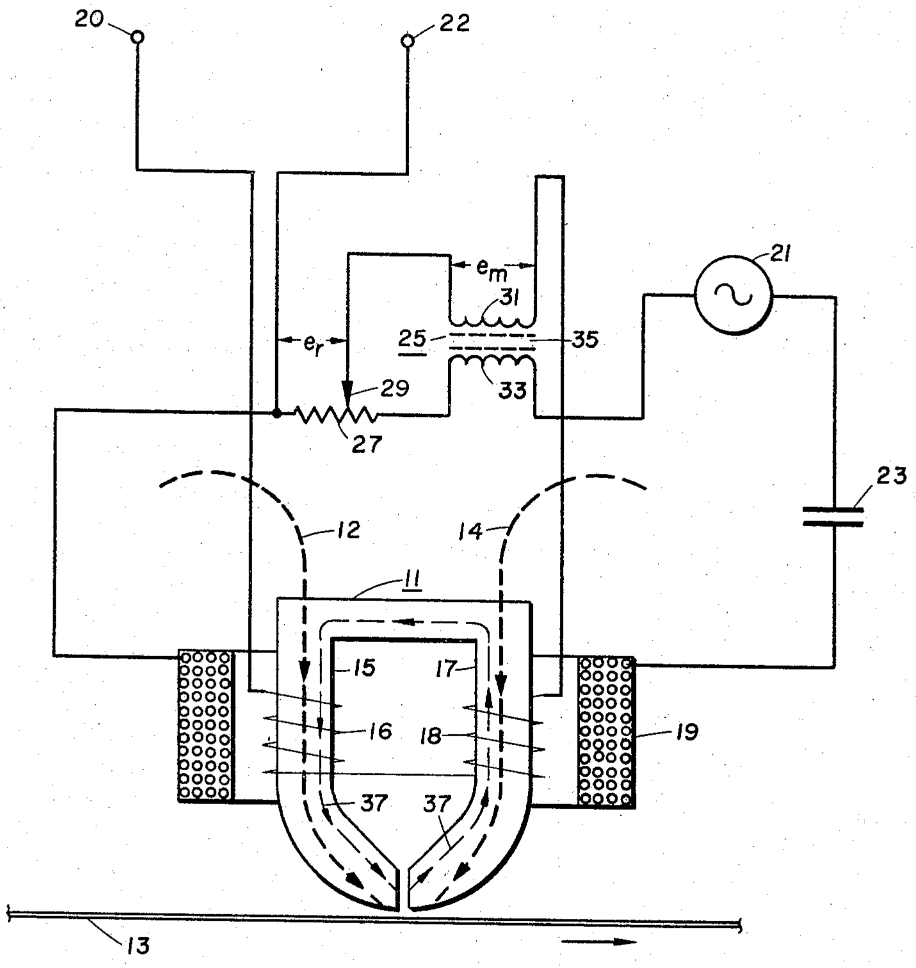

The invention described herein may be manufactured and used by or for the Government of the United States of America for governmental purposes without the payment of any royalties thereon or therefor.

This invention relates to recording heads for magnetic tape recorders and more particularly to a flux-responsive head for very low frequency operation.

In the magnetic recording art, particularly in tape recording, intelligence is recorded on a magnetic tape by producing a permanent magnetic flux upon the tape. Electric current representing the intelligence to be transferred to the tape is usually passed directly through the excitation winding of the recording head which produces magnetic impressions upon the tape. One of the most common methods for reproducing the information which has been recorded includes passing the magnetic tape over a reproducing or playback head which is usually similar in construction to the recording head. The magnetization of the tape produces flux in the core of the playback head and as this flux changes, a voltage is induced in the playback head windings. It is noted that the output voltage from the playback head is propotrional to the rate of change of flux and not to the flux magnitude in the tape itself. Thus the playback head acts as a differentiator, and the output voltage appearing across the head winding is actually the derivative of the recorded signal rather than the recorded signal itself. Evidently the rate of change of flux in the core of the playback head depends upon the frequency, that is the speed at which the tape is actually moving past the air gap of the playback head core. If the tape velocity is zero, then the output voltage of the head windings becomes zero.

For certain applications of magnetic tape recorders, particularly in the field of instrumentation, it is sometimes desirable to reproduce the recorded signal in a manner such that the reproduction of a magnetic record is independent of speed and may be accomplished even when the tape is stationary, thereby making it feasible to use it with an intermittently or slow moving tape. This tape of head, normally referred to as a flux-responsive head was introduced in 1949 by W. N. Gerber. In this type of reproducing head, a high frequency excitation current creates a periodically changing flux in an excitation core which intersects in a perpendicular manner the core structure of the playback head. Because of the changing permeability of the section of the core structure of the playback or reproducing head in common with the excitation core, which results from changes in the magnetic flux through the excitation core, actual reluctance of the reproducing head varies at twice the excitation frequency. The output voltage across the windings of the reproducer head therefore has a second harmonic frequency which is twice the frequency of the excitation voltage and has an amplitude proportional to the strength of the magnetic signal on the magnetic tape which is at the gap of the core of the reproducing head. The perpendicular disposition of the excitation core with respect to the core structure of the reproducer head insures that the excitation signal does not appear across the gap of the reproducer head to alter or even erase the signal picked up from the magnetic tape.

In the present invention a recording-playback head of a tape recorder is converted into a flux-responsive device by simply placing a coil around the core element of the recorder head and energizing the external winding or coil with a 20 kilocycle A-C voltage source. A balancing circuit is provided to cancel out any voltages which are induced in the reproducer head windings as a result of any mismatch between the two head winding, one disposed on each leg of the core.

It is an object of this invention to provide a simple flux-responsive head for magnetic tape recorders.

It is another object of this invention to provide a reproducing-playback head of a tape recorder with an external coil.

It is a further object to convert a conventional tape recorder head into a flux-responsive head by placing an external coil on the core of said head and energizing said coil with a high frequency A-C voltage.

Figure 2:
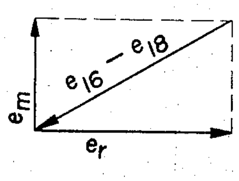
Figure 3:
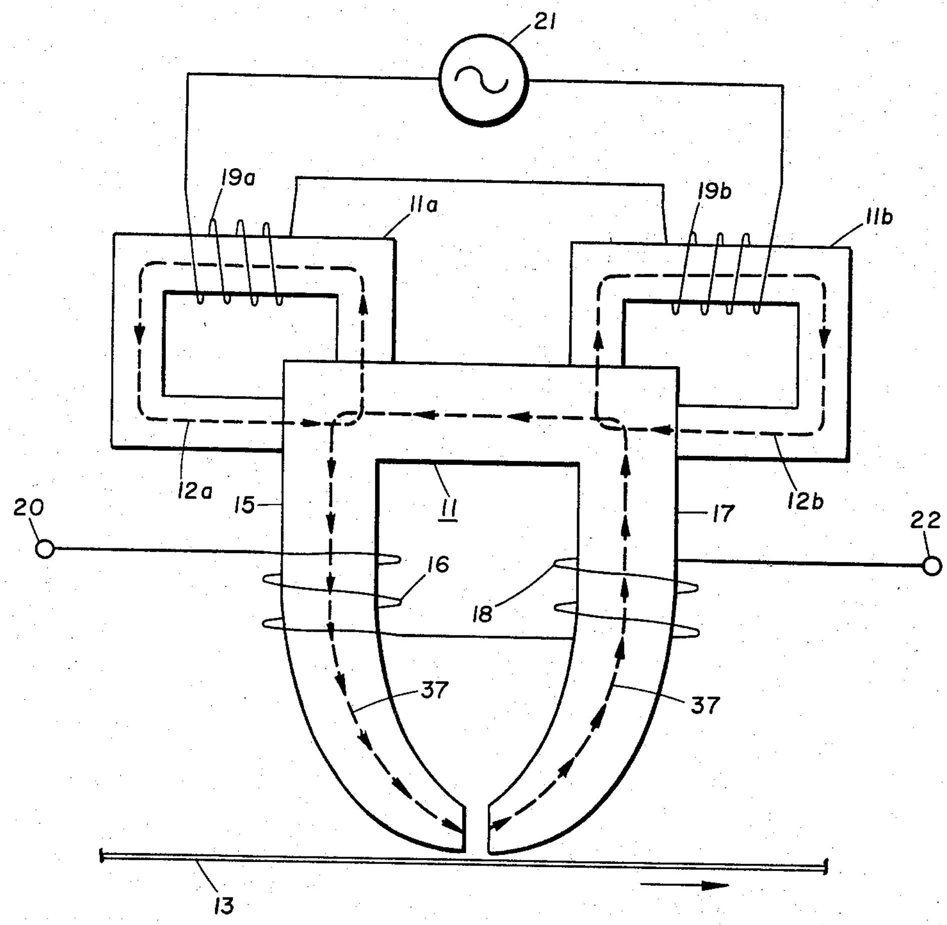

Other objects and many of the attendant advantages of this invention will be readily appreciated as the same becomes better understood by reference to the following detailed description when considered in connection with the accompanying drawings wherein:

FIG. 1 of the drawings illustrates the flux-responsive circuit of the instant invention;

FIG. 2 of the drawings illustrates a compensating voltage vector diagram for the energizing winding circuit of this invention; and FIG. 3 of the drawings illustrates another embodiment of a flux-responsive head.

Referring now to FIG. 1 of the drawings, a tape recorder head 11 is shown with a gap in close proximity to magnetic tape 13. Dotted lines 12 and 14 indicate magnetic flux passing through the recorder head 11. The arrow indicates the direction of tape movement. A first leg 15 of the recording head is provided with a winding 16 and a second leg 17 of the recording head is provided with a second winding 18. Windings 16 and 18 may be serially connected to an amplifier circuit, not shown, at terminals 20 and 22. An external winding 19 is provided on the recorder head which is connected to an A-C voltage source 21 through a capacitor 23. A-C voltage source 21 may be a transistor multivibrator or another type of A-C voltage source having a frequency in the order of 20 kilocycles per second. A balance circuit comprising a linear inductor 25 and a potentiometer 27 is employed for eliminating induced voltages in the output circuit of windings 16 and 18 due to any mismatch or unbalance in the windings 16 and 18 when the A-C voltage source 21 is applied to winding 19.

In the circuit of FIG. 1, capacitor 23 may be a 0.04 microfarad capacitor. Winding 19 may be made from 700 turns of No. 28 wire.

The potentiometer 27 has a moveable tap 29. The linear mutual inductor 25 has a first winding 31, a second winding 33, and a core 35 which may be powdered iron or the like; an air core inductor may also be used.

In operation, in the reproducing cycle for example, the intelligence recorded on tape is picked up by head 11 having a gap portion in close proximity to tape 13. The magnetic flux lines 37 represent the flux developed in core 11 by tape 13. These flux lines are introduced to the core at the gap. Flux lines 12 and 14 indicate the magnetic flux produced in cone 11 by the energization of coil or winding 19 during a particular time duration of the A-C voltage source, that is, during a positive half cycle, for example. The flux lines 12 and 14 repel each other at the point of the gap. Only stray fields of these flux lines travel through the tape 13. The voltage induced in windings 16 and 18 are normally equal and opposite. However, if there is a voltage difference produced, that is, for example, if $e_{16}$ is greater than $e_{18}$ then this voltage difference may be canceled out of the output circuit by the adjustment of tap 29 of the resistance means or potentiometer 27. As shown in FIG. 2 of the drawings the voltage, $e_{16}-e_{18}$ is balanced out by a voltage $e_r$ across the portion of potentiometer 27 in the circuit and a voltage $e_m$ across winding 31 of mutual inductor 25. It is noted that the vector sum of $e_m$ and $e_r$ is equal and opposite to the difference voltage $e_{16}-e_{18}$, as shown in FIG. 2.

Referring now to FIG. 3 of the drawings in which another embodiment of the flux responsive head of the instant invention is illustrated, a recording and playback head 11 is shown having leg 15 with a winding 16 thereon and a leg 17 with a winding 18 thereon. Windings 16 and 18 are serially connected and adapted to be connected to an outside circuit such as the input of an amplifier through terminals 20 and 22.

High frequency flux modulation of the core or head 11 is created by a high frequency circuit including winding 19*a* on core 11*a*, winding 19*b* on core 11*b* and a high frequency A-C voltage source 21. Windings 19*a* and 19*b* are serially connected to source 21. A capacitor, such as capacitor 23 of FIG. 1, may be employed in this circuit, if desired.

With the circuit arrangement of FIG. 3, the modulating or high frequency magnetic flux travels generally in the paths illustrated by flux lines 12*a* and 12*b*. Flux lines 12*a* and 12*b* have arrows indicating the direction of flux at a particular time period, that is, for example, positive half-cycles of voltage source 21. The modulating fluxes are limited to the corner portions of core 11 as is shown by flux lines 12*a* and 12*b*. It may be seen that flux line 37 intersects with flux lines 12*a* and 12*b* at the corner portions of the core in which the modulating magnetic fields are applied. It may also be seen that, at any particular time period, that is during any particular half-cycle of A-C voltage 21, the fluxes 12*a* and 12*b* are in phase opposition and therefore do not add a net flux to the recording head 11.

Cores 11*a* and 11*b* may be separate cores or they may be made as an integral part of core or head 11 by making the entire core assembly from a single piece or integral unit laminations.

Obviously many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. A flux-responsive magnetic tape reproducing head comprising,
- a saturable core with an air gap therein whereby magnetic flux paths may be interrupted,
- winding means on said core,
- said winding means adapted to be connected to reproducing circuits of a magnetic tape recorder,
- means for applying an ultrasonic frequency alternating magnetic field to a first portion of said core and to a second portion of said core in out-of-phase relationship whereby said head is made flux-responsive and compensating means for eliminating voltages induced in said winding means from the application of said alternating magnetic field to said core.

2. A flux-responsive magnetic tape reproducing head comprising,
- a saturable core, said core having an air gap therein, a first leg portion, and a second leg portion,
- a first winding on the first leg portion of said core,
- a second winding on the second leg portion of said core,

- said first and second windings serially connected to form a winding circuit,
- said winding circuit adapted to be connected to reproducing circuits of a magnetic tape recorder,
- means for applying an ultrasonic frequency alternating magnetic field to said first and second leg portions of said core in opposite phase relationship,
- compensating means eliminating voltages induced in said winding circuit from the application of said alternating magnetic field to said core.

3. A flux-responsive magnetic tap reproducing head as in claim 2 in which said means for applying the ultrasonic frequency alternating magnetic field to said core includes a first core having a first winding thereon, a second core having a second winding thereon, said windings connected in series opposition to a source of high frequency A-C voltage.

4. A flux-responsive magnetic tape reproducing head as in claim 2 in which the means for applying the ultrasonic frequency alternating magnetic field to said core is an external winding encircling bth said first and second leg portons of said core and connected to a source of high frequency A-C voltage.

5. A flux-responsive magnetic tape reprodocing head as in claim 4 in which said compensating means includes a linear mutual inductor having a first winding and a second winding, a potentiometer having a resistance element with a moveable tap thereon, said first inductor winding connected to said tap and to said winding circuit, the resistance of said potentiometer and the second inductor winding of said inductor being serially connected between said source of high frequency voltage and said external winding.

6. A flux-responsive magnetic tape reproducing head comprising,
- a saturable core having a first leg, a second leg and an air gap therebetween,
- a first winding means on the first leg of said core,
- a second winding means on the second leg of said core,
- means applying an ultrasonice frequency alternating magnetic field to said core,
- said first and second windings serially connected and fonming a winding circuit, and
- mutual inductance means coupled to said winding circuit whereby voltages developed in said winding circuit from the application of said alternating magnetic field to said core may be canceled out.

7. A flux-responsive tape reproducer head comprising,
- a saturable core having a pair of legs,
- a first winding on a first leg of said core,
- a second winding on a second leg of said core,
- said windings serially interconnected to form an excitation circuit,
- an external winding would around both legs of said core,
- a high frequency A-C voltage source,
- means connecting said A-C voltage source to said external winding, and
- a voltage compensating circuit connected between said external winding and said excitation circuit whereby voltages induced in said excitation circuit from said external winding may be canceled out.

8. A flux-responsive magnetic tape reproducing head comprising,
- a saturable core having a pair of legs with an air gap therebetween,
- a first energizing winding on a first leg of said core,
- a second energizing winding on a second leg of said core,
- a third winding wound externally around both legs of said core,
- said first and second winding serially interconnected to form an excitation circuit, said excitation circuit having first and second output terminals, said first output terminal connected to said first energizing winding, an A-C voltage source having a frequency in the order of 20 kilocycles, means connecting said A-C voltage source to said third winding, balancing means including a potentiometer and a mutual inductor having a first winding and a second winding, said potentiometer having a resistance element with a moveable tap thereon, means serially connecting said resistance element and said first inductor winding between said A-C voltage source and said third winding, means connecting said second output terminal to one end of said resistance element, and means serially connecting said second inductor winding between said moveable tap and said second winding on said second leg of said core whereby voltage induced in said winding circuit from said high frequency A-C voltage source may be canceled out.

References Cited

UNITED STATES PATENTS

| | | | |
|---|---|---|---|
| 3,016,427 | 1/1962 | Grant | 179—100.2 |
| 2,995,631 | 8/1961 | Rubens | 179—100.2 |
| 2,870,267 | 1/1959 | Duinker et al. | 179—100.2 |

TERRELL W. FEARS, *Primary Examiner.*

BERNARD KONICK, *Examiner.*

A. I. NEUSTADT, *Assistant Examiner.*